United States Patent Office 2,703,401
Patented Mar. 1, 1955

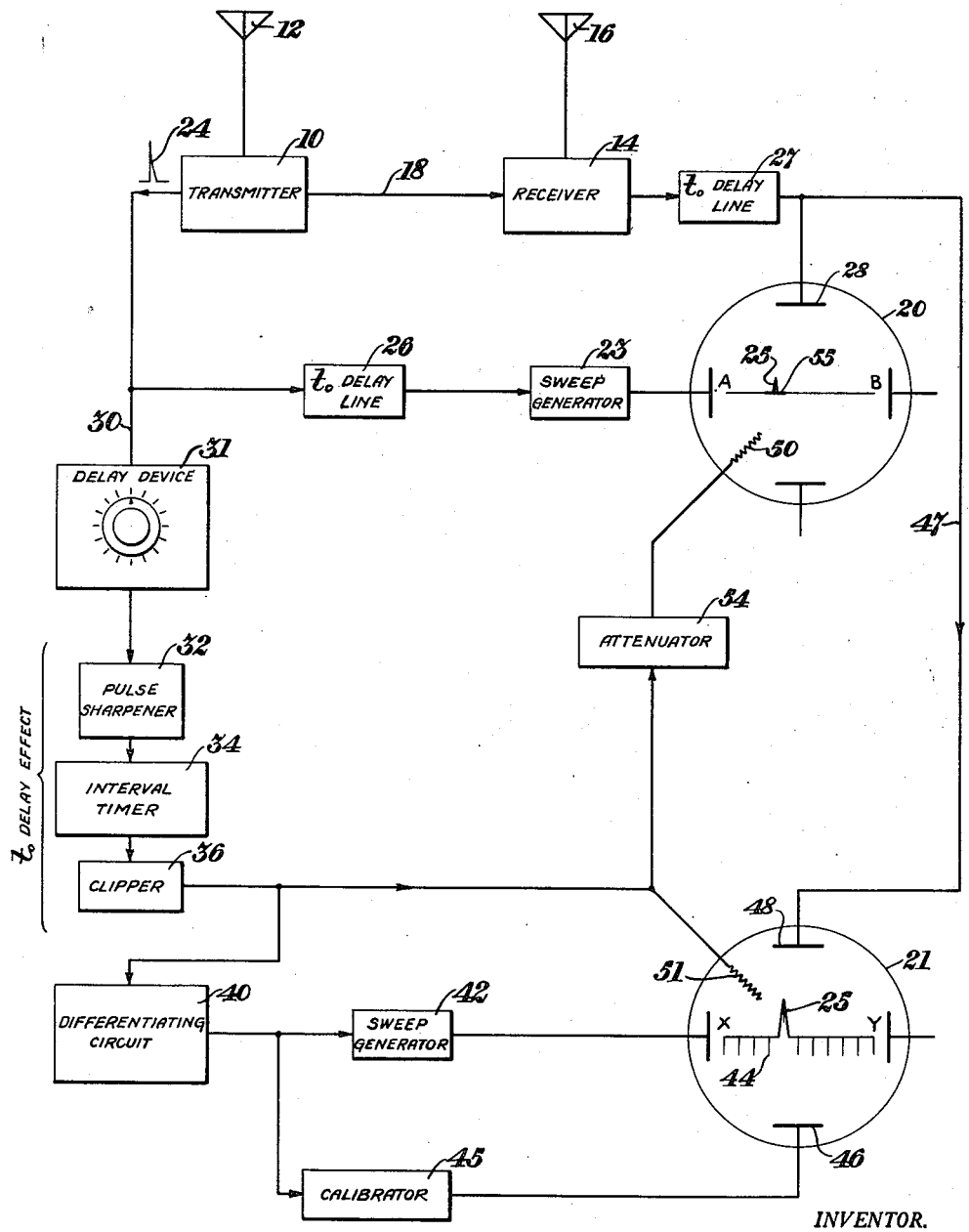

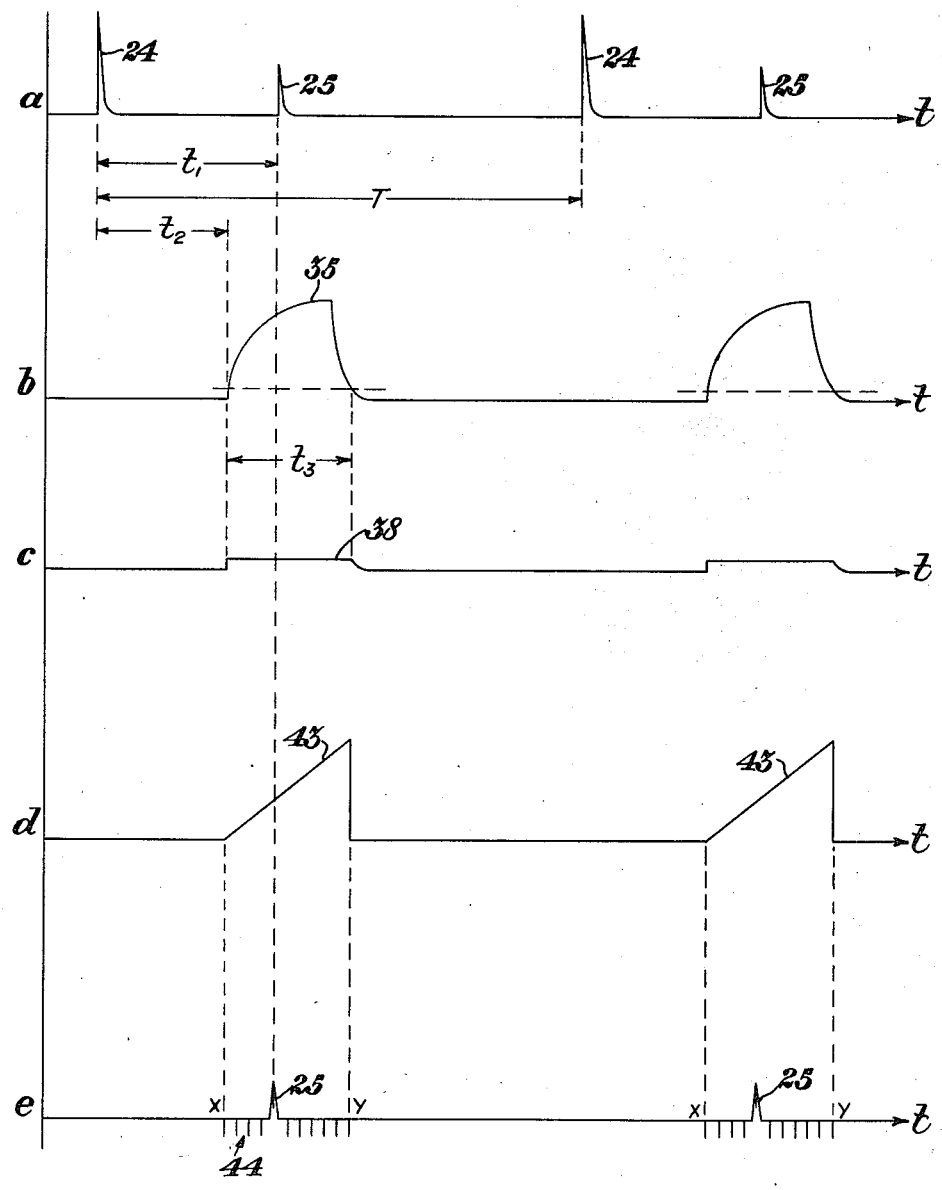

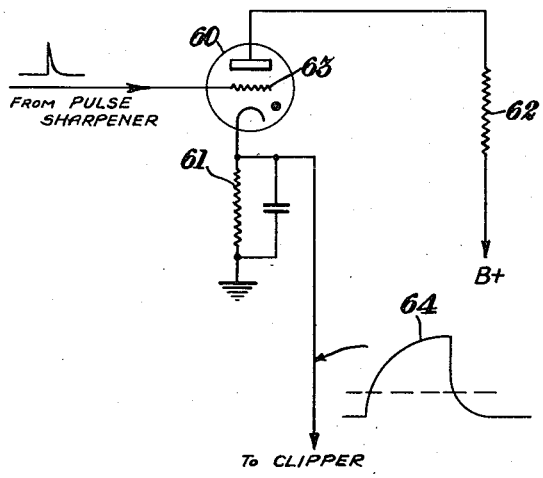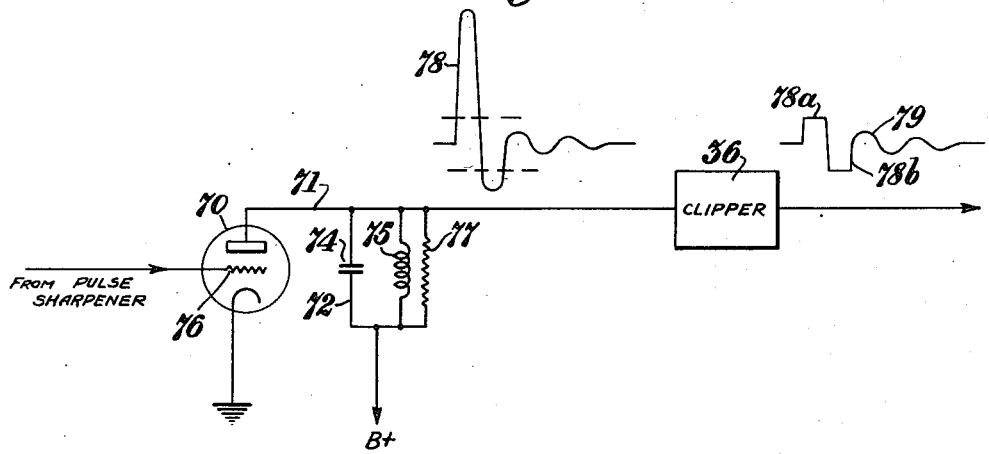

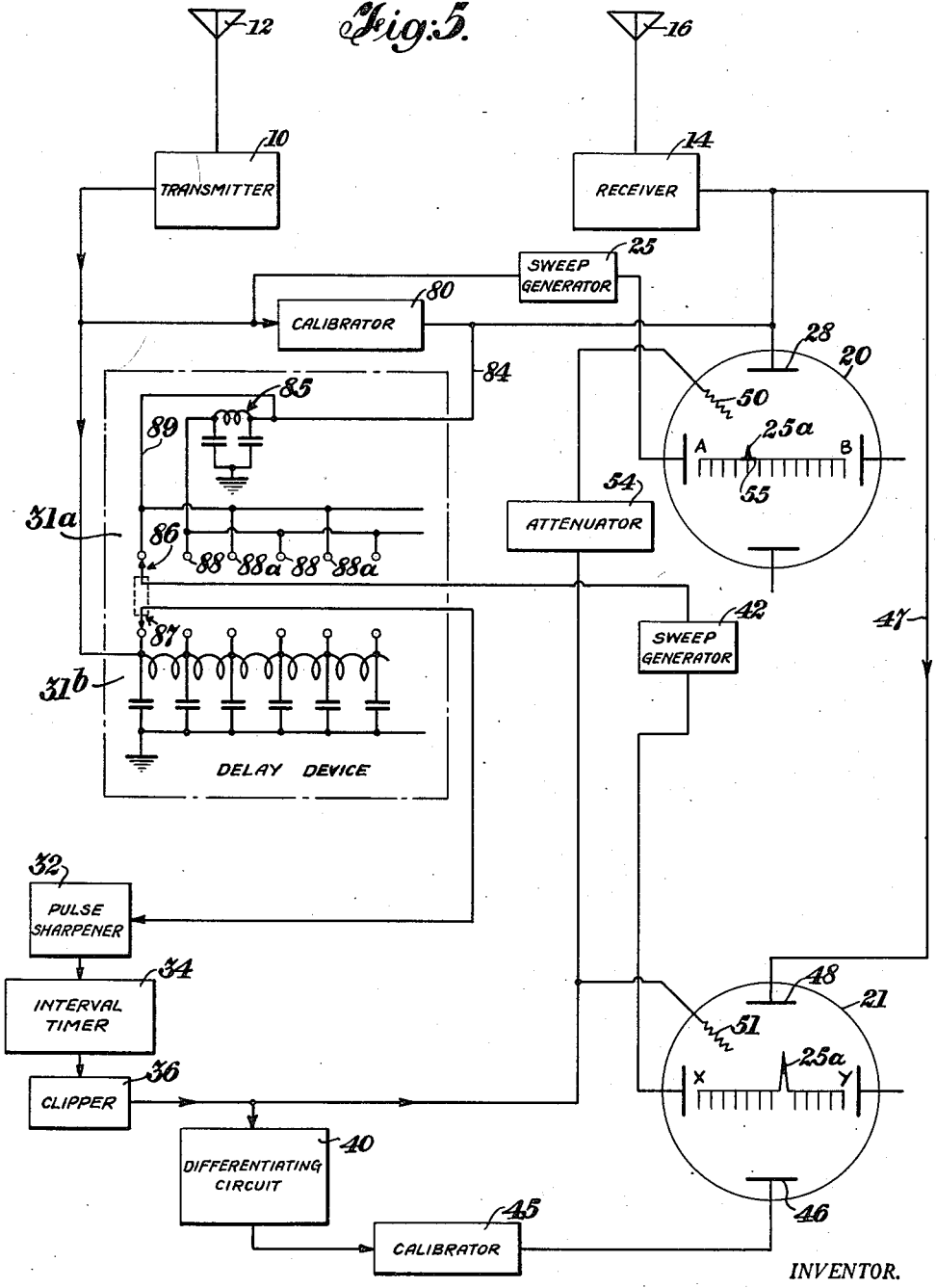

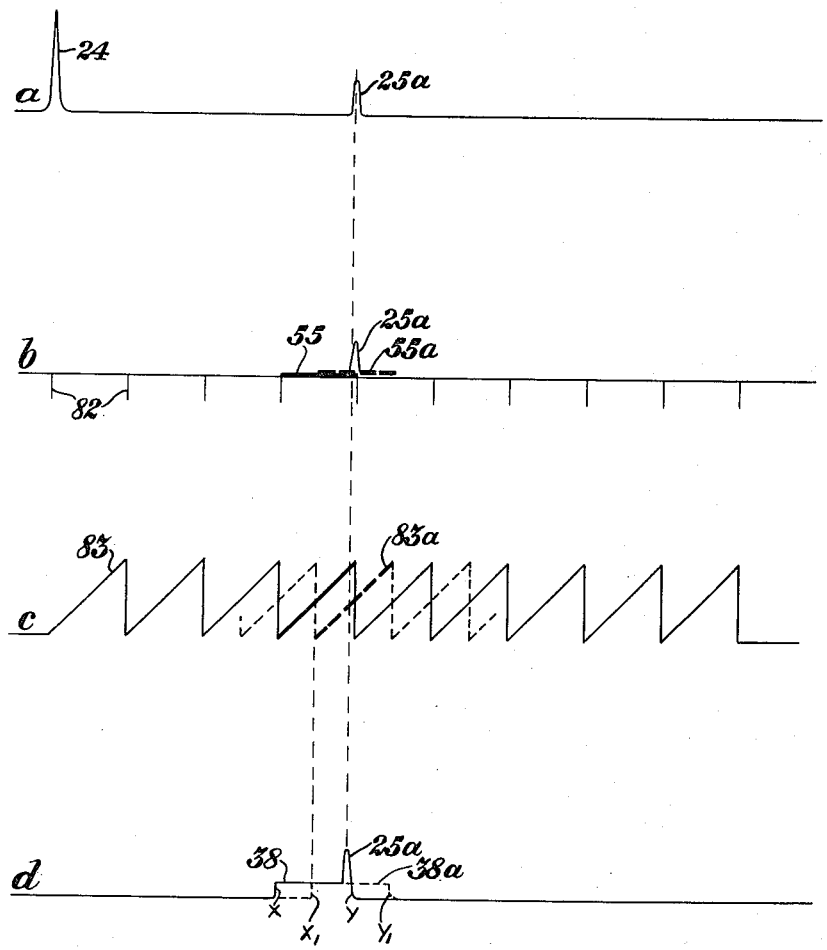

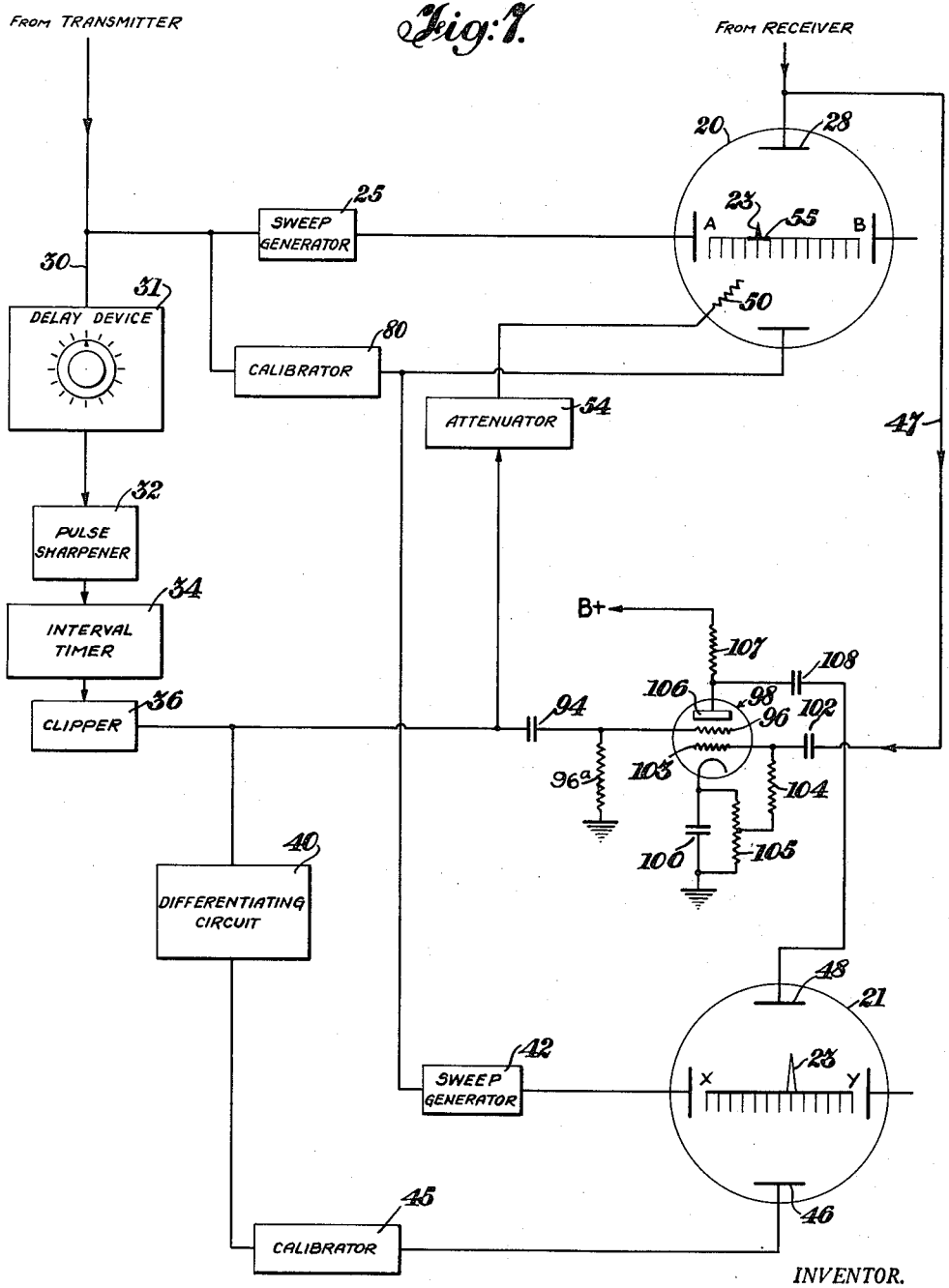

2,703,401

RADIO DETECTION SYSTEM

Louis A. De Rosa, Staten Island, N. Y., assignor to International Telephone and Telegraph Corporation, a corporation of Maryland Application October 31, 1942, Serial No. 464,008

19 Claims. (Cl. 343—13)

This invention relates to a radio detection system such as used for detecting hostile aircraft and ships and more particularly to a method and means for determining the distances to such obstacles when detected by the system.

In the copending application of H. Busignies, Serial No. 461,307 filed October 8, 1942, now U. S. Patent 2,471,408 issued May 31, 1949, a radio detection system is disclosed providing for the generation of a reference pulse in synchronism with the transmission of a transmitted impulse and the application of the reference pulse to a first oscillograph to produce thereon a reference indicator to determine by coincidence with an echo pulse the distance to the obstacle causing such echo pulse. Energy of the reference pulse is simultaneously used to control the sweep circuit of a second oscillograph so as to magnify on the screen thereof a small part of the total range covered by the first oscillograph. The second oscillograph is used to effect as close a coincidence of the reference and the echo pulses as the adjustment of the system is capable of effecting.

In a copending application of E. Labin and D. D. Grieg, Serial No. 437,530, filed April 3, 1942, a radio detection system is disclosed wherein the reference indicator or marker is so proportioned as to cover a part of the trace line on the first oscillograph corresponding to the time interval covered by the trace line on the second oscillograph. This marker indicates to the operator the portion of the range covered by the first oscillograph which the trace line of the second oscillograph covers, the latter being at a greater rate of speed thereby magnifying in effect the corresponding portion of the tracing contained within the extremities of the marker.

It is an object of this invention to provide a method and means in addition to the method and means disclosed in the aforesaid copending applications for determining with a high degree of accuracy the distances to obstacles detected by the system.

Another object of this invention is to provide a method and means of indicating as a reference indicator on a first or panoramic oscillograph the portion of a sweep thereof covered by a second or vernier oscillograph.

The above objects and others ancillary thereto will become more apparent upon consideration of the following detailed description to be read in connection with the accompanying drawings, in which:

Fig. 1 is a schematic illustration of a radio detection system in accordance with this invention;

Fig. 2 is a graphical illustration of the operation of the system illustrated in Fig. 1;

Figs. 3 and 4 are schematic illustrations of interval timers that may be used in the system illustrated in Fig. 1;

Fig. 5 is a schematic illustration of another form of radio detection system of this invention;

Fig. 6 is a graphical illustration of the operation of the system shown in Fig. 5; and Fig. 7 is a schematic illustration of a further form of radio detection system of this invention.

For the sake of clearness, the same reference characters are used in the several forms of systems herein disclosed where the elements and the functions thereof are substantially the same throughout the several forms.

Referring to Fig. 1 of the drawings, the radio detection system therein illustrated includes a known transmitter 10 and an antenna 12 for transmission of recurring impulses. The transmission of impulses may be recurrent at a given frequency or the recurrence may be unsteady.

A receiver 14 and antenna 16 together with cathode ray oscillographs 20 and 21 are provided to receive and indicate echo pulses caused by obstacles in response to the transmitted impulses. Connecting the transmitter to the receiver is the usual blocking circuit 18 arranged to block the receiver during the transmission of impulses. The oscillograph 20 is in the nature of a panoramic oscillograph which is used to indicate echo pulses throughout a given range such as 150 miles more or less. The oscillograph 21 is arranged to cover a selected small portion of the sweep of the panoramic oscillograph 20 for vernier determination of the distance to a particular echo pulse, whereby distances to obstacles causing the echo pulses can be determined with a high degree of accuracy.

The sweep circuit of the oscillograph 20 is controlled by the transmission of impulses 24, the energy of the transmitted impulses being applied to a sweep generator 23 through a time delay line 26 having a retarding characteristic $t_0$ on the energy passed therethrough. Likewise, delay line 27 of retardation $t_0$ is disposed between the receiver and the vertical plate 28 of the oscillograph 20. Since the same delay is applied to both the energy controlling the sweep of the oscillograph and the echo pulse applied to the deflecting plate 28, the retardation effects cancel insofar as the oscillograph 20 is concerned. This delay feature, however, has an important bearing, as hereinafter described, upon the timing applied to the oscillograph 21.

Energy of the transmitted impulses 24 is applied through a circuit 30 including an adjustable delay device 31 calibrated and arranged for adjustment in steps similarly as disclosed in the aforementioned copending application of H. Busignies, Serial No. 461,307. The output of the delay device 31 is applied to a pulse sharpener 32 whereby any alteration of the pulse due to the action of the delay device is compensated. The pulse energy from the sharpener 32 is applied to an interval timer 34 which, preferably, is of a known relaxation multivibrator, arranged to have one mode of stability. The multivibrator, for example, is preferably arranged so that when pulse energy is applied thereto it will operate to build up a potential and then suddenly drop back to zero, all during a predetermined time interval.

The operation of the interval timer 34 will be clear from a study of Fig. 2. In part $a$ two recurring impulses 24 are shown together with an echo pulse 25 caused by some obstacle in response to the transmission of the impulses 24. The two impulses 24 are shown separated by a time interval $T$ which may vary for successive impulses. The time intervals $t_1$ between the pulse 24 and the echo pulse 25 is the interval which must be determined in order to obtain the distance to the obstacle causing the echo pulse. The delay device 31 retards the energy of the impulse 24 applied to the circuit 30 and when it reaches the interval timer 34 an adjustable time period $t_2$ has elapsed. This interval $t_2$ will be readable on the calibrations of the delay device 31. The potential produced by the interval timer 34 is indicated at $b$ (Fig. 2) as an impulse 35 which has a duration $t_3$.

The output of the timer 34 is applied to a clipper 36 whereby a substantially rectangular pulse 38 is produced. This rectangular pulse is applied to a differentiating circuit 40 and the pulses produced thereby are used to control a sweep generator 42 for the vernier oscillograph 21. The sweep potentials 43 thus generated are indicated at $d$ (Fig. 2). Energy from the differentiating circuit 40 is also applied to a known form of calibrator 45 or preferably of the character disclosed in my copending application, Serial No. 466,557 filed November 23, 1942, now U. S. Patent 2,438,904 issued April 6, 1948, wherein the trains of unidirectional sharply pointed pulses of substantially constant amplitude are produced from a damped wave train generated in synchronism with the transmission of the impulses 24, the wave trains being clipped to produce substantially rectangular pulses which in turn are differentiated and passed through a class "C" amplifier. The calibrating pulses 44 generated are applied to the vertical deflecting plate 46 of the vernier oscillograph 21 and appear along the sweep line as indicated at $e$ (Fig. 2). One suitable form of calibrator involving a frequency multiplier and a peak voltage amplifier is disclosed in U. S. Patent to Jakel et al. 2,178,074 dated October 31, 1939.

Energy of the echo pulses is received from the output of the delay line 27 and applied over a connection 47 to the vertical plate 48 of the oscillograph 21. It will be noted that the delay line 27 is effective on the timing of the echo pulse whereas the delay line 26 is not effective on the timing of the sweep generator 42. The time interval $t_0$ of the delay lines 26 and 27 is chosen to compensate for any delay that may be produced upon the energy passing through the circuit 30, the adjustment of the device 31 being disregarded. Thus, any delay caused in the circuit 30 is exactly compensated for and the timing of the echo pulse appearing on the vernier oscillograph can be determined directly by the adjustment of the delay device 31 plus the number of divisions the pulse 25 appears from the left hand end of the trace line X—Y on the vernier oscillograph 21.

In order to indicate the part of the sweep A—B of the oscillograph 20 appearing as the sweep X—Y of the vernier oscillograph 21, I apply the energy of the rectangular pulse 38 (Fig. 2) to a beam intensity or focusing control element of the oscillographs 20 and 21. For example, the rectangular pulse energy is applied to the grids 50 and 51 of the oscillographs 20 and 21. This rectangular energy being in synchronism with the pulses from the differentiating circuit 40 which control the sweep generator 42 and the calibrator 45 will render the sweep X—Y for the oscillograph 21 perceptible throughout the full extent thereof. Since the sweep A—B of the oscillograph 20 is normally perceptible, the rectangular pulse energy is applied to the grid 50 through an attenuator 54. This added potential on the grid 50 causes a small portion of the sweep A—B equal to the duration of impulse 38 to be more brilliant than the remainder thereof, thus operating as an indicator 55. It thus follows that the length of the indicator 55 defines the portion of the sweep A—B which appears as the sweep X—Y of the vernier oscillograph 21.

It will be clear, therefore, that when the indicator 55 is moved along the trace line A—B, by adjustment of the delay device 31, until it underlies or includes a particular echo pulse, such as the pulse 25, the echo pulse will appear on the screen of the vernier oscillograph 21. The time interval $t_1$ between the transmission of the impulse 24 and the reception of the echo pulse 25 can then be readily determined with a high degree of accuracy because of the magnification of the sweep portion covered by the indicator 55.

In order to avoid the occurrence of the echo pulse 25 at the extremity of the trace line X—Y, it being desirable for accuracy to obtain its appearance more nearly at the central portion of the screen, the delay device 31 is preferably provided with steps which will provide retardation intervals shorter than the interval $t_3$, the width of the rectangular pulse 38. For example, where the delay period of each delay step of the device 31 is equal to one-half of the interval $t_3$, the movement of the indicator 55 will occur in steps one-half the length of the indicator. Thus, for one position of the delay device 31, should the echo pulse occur at the extremity of the indicator 55, the next step of the device 31 will place the echo pulse at the central portion of the indicator.

In Figs. 3 and 4 I have shown two additional interval timers which may be used at 34 in the place of a multivibrator. The timer shown in Fig. 3 comprises a circuit including a gaseous discharge control element such as a thyratron tube 60, the cathode of which is self-biased by a resistance-capacitance circuit 61 and the plate of which has impressed thereon a positive potential through a resistance 62. The impulse energy received from the pulse sharpener 32 is applied to the grid 63 of the tube to control the operation thereof. The self-biasing of the tube is arranged to produce impulses of extended duration similarly as in the case of the multivibrator hereinbefore described. The impulse 64 is clipped in the same manner as illustrated in Fig. 2 to provide the rectangular pulse energy desired.

The interval timer shown in Fig. 4 comprises a circuit including a triode 70, the plate circuit 71 of which includes a highly damped circuit 72. This circuit has a condenser 74 and an inductance 75 tuned for shock excitation in response to pulse energy applied to the grid 76. Across the tuned circuit 72 is a high resistance 77 which renders the circuit highly damped. This results in an oscillation 78 which is rapidly damped out. When this oscillation is applied to the clipper 36 the positive rectangular portion 78a thereof can be used as the rectangular pulse 38. The negative portion 78b has no effect and trailing oscillations 79 are of such small magnitude as to have negligible effect upon the system.

The radio detection system illustrated in Fig. 5 is similar to the system shown in Fig. 1 in that the indicator 55 on the panoramic oscillograph 20 designates the portion of the sweep thereof which is magnified and produced as the sweep of the vernier oscillograph 21. This system, however, is distinguished from the system of Fig. 1 in the manner in which the indicator 55 is produced as well as the manner in which the sweep of the vernier oscillograph is produced. In addition, the trace line A—B of the oscillograph 20 is calibrated by applying energy of the transmitted impulses to a calibrator 80 of the character disclosed in my aforesaid copending application, Serial No. 466,557. Pulse markers produced by the calibrator 80 are used to control the sweep generator 42 of the vernier oscillograph. As shown in Fig. 6, a series of pulse markers 82 are produced in response to the transmitted impulse 24. For each of these pulse markers the sweep generator 42 produces a saw-tooth 83. The pulse marker 55 may be chosen of any desired length relative to a scale division and as shown may be equal to a scale division. Thus, for the embodiment shown the sweep X—Y of the oscillograph 21 will cover a part of the sweep A—B indicated by the indicator 55.

The delay device 31a is provided with an adjustable portion 31b having steps which may correspond to the scale divisions of the oscillograph 20 or any other time increment desired. Should the delay steps be equal to a scale division, the indicator 55 would then move in steps corresponding to the scale divisions. This, however, will produce the same difficulty above referred to where the echo appears at one end of the marker. In this form I overcome this difficulty by providing double the number of delay steps in the section 31b as there are scale divisions.

In order to control the sweep generator 42 in accordance with the delay steps of section 31b, I provide a short delay line 85 together with switching means 86 coupled with the switching element 87 of the delay section 31b whereby the small delay section 85 is switched in and out of the circuit 84 leading to the sweep generator 42. The delay line 85 is chosen equal to one delay step of the delay section 31b, and when the setting of the delay section 31b is in agreement with a scale division the delay line 85 is cut out and when the setting overlaps two scale divisions the delay line 85 is cut in. This is accomplished by switching means 86 having a number of alternate contacts 88 and 88a the total of which corresponds to the number of contacts of the section 31b. The contacts 88 are connected to the output of the delay line 85 while the contacts 88a are connected to a circuit 89 which by-passes the delay line 85.

It will be understood that with this delay arrangement the indicator 55 is caused to move in steps equal to one-half the length of the indicator. Parts b, c and d of Fig. 6 indicate this step movement. In b the indicator 55 is shifted one step to position 55a, in c the sweep 83 is shifted as indicated at 83a and the rectangular pulse 38 is shifted to the position indicated at 38a. The indicator 55 is thus always in line with one of the sweeps 83.

From the foregoing, it will be clear that the indicator 55 and the sweep X—Y are shifted along the range of the system in overlapping steps so that an echo pulse, regardless of where it occurs along the sweep A—B of the oscillograph, can be located in or near the central portion of the sweep X—Y of the oscillograph 21. While I have indicated that this overlap may occur in one-half lengths of the indicator 55, it will be understood that other overlapping proportions can be used.

In Fig. 7 I show a radio detection system similar to that shown in Fig. 5 except that the calibrator 80 used for the oscillograph 20 is here used for controlling the sweep generator 42, without the intervention of the delay line 85. Thus, a plurality of sweeps 83 (Fig. 6) will occur for the oscillograph 21, one for each scale division of the sweep line of the oscillograph 20. With this connection there will be no distinction between the different sweeps produced on the oscillograph 21. This would appear to cause overlapping of different echo pulses but I avoid this by blocking unwanted echo pulses. To accomplish this I connect the output of the clipper 36 through a circuit having a condenser 94 and a resistance 96 to the grid 96a of a vacuum tube 98. The cathode is self-biased by a capacity-resistance circuit 100. The outlet connection 47 of the receiver is connected through a condenser 102 to a second grid 103. The grid terminal is connected through a resistance 104 to a tap along the resistance 105 of the self-biasing circuit 100. The plate 106 is connected through a resistance 107 to the positive pole of battery, and condenser 108 to the vertical plate 48 of the oscillograph 21. A suitable bias is applied to the plate circuit.

In operation, the rectangular pulse output of the clipper 36 is applied to the grid 96 thereby rendering the tube 98 operative to pass echo signals received on the grid 103. These echo signals are passed to the vertical plate of the oscillograph 21 only during the duration of the rectangular pulse applied to the grid 96. This results in the passage of echo pulses received during the scale division at which the indicator 55 is located. The pulses received during the remainder of the range of the sweep A—B are thus blocked from passage to the oscillograph 21.

While I have shown both in Figs. 5 and 7 radio detection systems without the compensating delay lines 26 and 27 shown in Fig. 1 it will be understood that they may be so provided. Since the delay effect of the apparatus of circuit 30 can be determined, the delay device 31 may be calibrated to account for this delay effect and the oscillograph 21 may be blocked out for a portion corresponding to this delay effect. Such a delay is exceptionally small and for many uses of the radio detection system it need not be compensated for.

While I have described above the principles of my invention with connection to specific apparatus and particular modifications thereof, it is to be clearly understood that this description is made only by way of example and not as a limitation on the scope of my invention as set forth in the objects of the invention and the accompanying claims.

What I claim is:

1. A radio detection system comprising means to transmit impulses, receiver means including a receiver and first and second oscillographs to receive and indicate echo pulses caused by obstacles in response to transmitted impulses, means responsive to impulse transmission to generate a sweep potential for the first oscillograph, reference indicator control means including means to generate a reference pulse of given duration and means to apply said reference pulse to said first oscillograph to produce thereon a reference indicator designating a time interval corresponding to said given duration, means to generate a sweep potential for the second oscillograph, means using energy of said reference pulse to synchronize the sweep of said second oscillograph with the part of the sweep of said first oscillograph designated by said reference indicator, a first delay line interposed between the receiver and the first and second oscillographs to compensate for delay effect inherent in the reference pulse generating means, and a second delay line of retardation effect equal to said first delay line to retard the energy controlling said sweep generating means so that the echo pulse indications of the first and second oscillographs correspond.

2. A system comprising first and second oscillographs, means to generate periodic sweep pulses for the first oscillograph, means to generate a plurality of calibration pulses for each sweep pulse and for applying the calibration pulses to the first oscillograph, means to generate a sweep potential for the second oscillograph the time interval of which is equal to the time interval set off between adjacent calibration pulses on the first oscillograph, means to control the timing of the sweep of the second oscillograph relative to the sweep of the first oscillograph, and indicator means to provide a reference indication on the first oscillograph of a given duration corresponding to the time interval of the sweep of said second oscillograph.

3. The system defined in claim 2 wherein the means to control the sweep timing includes a first delay line adjustable to shift the indicator along the sweep of the first oscillograph, in overlapping steps, a second delay line to control the pulse energy controlling the sweep generating means for the second oscillograph, and means to cut said second delay line into and out of circuit in accordance with adjustment of the first delay line so that the sweep of the second oscillograph always agrees with the interval designated by said indicator.

4. The system defined in claim 2 wherein the means to control the timing of the sweep of the second oscillograph includes means to render perceptible the sweep thereof corresponding to the time position of the indicator on the first oscillograph.

5. The system defined in claim 2 and including means to apply received pulses to said first oscillograph, and means controlled by said indicator means to apply only given pulses on the second oscillograph which appear on the part of the first oscillograph designated by said reference indication.

6. A radio detection system comprising means to transmit impulses, receiver means including a receiver and first and second oscillographs to receive and indicate echo pulses caused by obstacles in response to transmitted impulses, means to generate a sweep potential for the first oscillograph in synchronism with the transmission of an impulse, means to generate in a given time relation with said sweep potential a plurality of calibration pulses for the first oscillograph, means to generate a sweep potential for the second oscillograph the time interval of which is equal to the time interval set off between adjacent calibration pulses on the first oscillograph, means to control the timing of the sweep of the second oscillograph relative to the sweep of the first oscillograph, and means to provide an indicator on the first oscillograph of a given duration corresponding to the time interval of the sweep of said second oscillograph.

7. In a system of determining the distance to an obstacle, a signal transmitter, an echo signal receiver, a first and a second cathode ray tube, each having a fluorescent screen and means for producing an electron beam controlled to produce sweeps thereon, means controlled by the receiver for producing indicia on the trace lines of both tubes, means in the transmitter for generating a reference pulse having a given duration, means for applying energy of said reference pulse to the first tube to produce on the screen thereof a reference indicator designating a time interval corresponding to said given duration, means for adjusting the time relation of the reference pulse so that the indicator produced thereby is positioned at the indicium of an echo signal appearing upon the first tube, means for producing calibration marks on the trace line of the first tube with respect to the reference pulse, means responsive to the production of each calibration mark to control the sweeps produced for the second tube, whereby the number of sweeps produced for the second tube during a single sweep for the first tube is equal to the number of calibration marks on the trace line of the first tube, and means for applying to the second tube only the echo pulses received in the time interval designated by the location of the reference indicator.

8. In a system of determining tthe distance to an obstacle, a signal transmitter, an echo signal receiver, a first and a second cathode ray tube, each having a fluorescent screen and means for producing an electron beam controlled to produce sweeps thereon, means controlled by the receiver for producing indicia on the trace lines of both tubes, means in the transmitter for generating a reference pulse having a given duration, means for applying energy of said reference pulse to the first tube to produce on the screen thereof a reference indicator designating a time interval corresponding to said given duration, means for adjusting the time relation of the reference pulse by increments of time, each less than said given duration, so that the indicator produced thereby is positioned at the indicium of an echo signal appearing upon the first tube, means for producing for the second tube a plurality of sweeps for each sweep of the first tube, means responsive to the reference pulse to render perceptible only a selected one of the sweeps produced for the second tube, and means for varying the timing of the sweeps of the second tube according to the time adjustments of the reference pulse.

9. In a system of determining the distance to an obstacle, a signal transmitter, an echo signal receiver, a first and a second cathode ray tube, each having a fluorescent screen and means for producing an electron beam, means to control the beam of said first tube in synchronism with the operation of said transmitter, means controlled by the receiver for producing indicia on the trace lines of both tubes, means for generating in synchronism with the operation of said transmitter a reference pulse having a given duration, means for applying energy of said reference pulse to the first tube to increase the brilliance of the trace line thereof thereby producing a reference indicator designating a time interval corresponding to said given duration, means synchronized with the reference pulse to control the sweep of the second tube to correspond with that part of the trace line of the first tube which is designated by the reference indicator.

10. The system according to claim 9, wherein the means for controlling the beam of each tube includes means for generating trains of pulses in time relation with respect to a transmitted signal, means responsive to said trains of pulses to calibrate the trace line of the first tube and means controlled by said trains of pulses to control the sweep of the second tube.

11. In combination, a cathode ray oscillograph having means for generating a beam of electrons, a luminescent screen, and two sets of beam deflecting elements, means for generating a series of pulses, the frequency of repetition of which varies from time to time, means responsive to each pulse in the series for generating a sweep wave, means for applying the sweep wave to one set of said beam deflecting elements, means responsive to each pulse in the series for producing a second series of pulses at a fixed repetition frequency, the pulses of each of said second series having the same spacing as in every other one of said second series even though the period between successive pulses in said first-mentioned series varies and each of the pulses in the second series having a duration which is only a very small fraction of the time interval between the pulses in said first-mentioned series, and means for applying said second-mentioned series of pulses to the other of said sets of beam deflecting elements.

12. In combination, means for generating a series of pulses, the frequency of repetition of which varies from time to time, means for producing in response to each pulse in the series a train of signal energy comprising a series of sharp, equally-spaced pulses of like duration and shape, a cathode ray oscilloscope including means for generating a beam of electrons and two sets of deflecting elements for causing said beam to be deflected in two directions at right angles to each other, means for applying said trains of signal energy to one set of deflecting elements, means responsive to each pulse in said series for setting up a timing wave, means for applying said timing wave to the same set of deflecting elements to which said trains of signal energy are applied, means for generating a sweep wave in response to each pulse in said series, and means for applying said sweep wave to the other set of deflecting elements.

13. The combination of elements as in claim 12 in further combination with means for blanking out the beam in said oscilloscope except for the period of time covered by said sweep wave.

14. The combination of elements as in claim 12 in further combination with means for delaying the start of said sweep wave until a predetermined time after the occurrence of each pulse in said series.

15. A cathode ray oscillograph device comprising a cathode ray tube having a fluorescent screen, means for producing a repetitive time-base for displaying a repetitive applied signal input; means for providing a series of timing signals occurring at predetermined instants after the commencement of each scan of said repetitive time-base and in locked timing relationship to the instant which marks the commencement of each of said scans, means for applying said timing signals to the cathode ray tube to cause visible timing marks on said time-base scans, means for generating a marking signal at the end of an adjustable interval of time after the instant of commencement of each scan of said time-base, means for applying said marking signal to the cathode ray tube to produce a visible marking indication adjustable in position along said time-base, means for producing a further time-base operating at a higher scanning speed than said first time-base, means for applying said marking signal to control said further time-base producing means to cause the latter to commence its scanning operation at a time coincident with the beginning of said marking signal and means for applying the repetitive applied signal input to cause a display of that portion thereof which is coincident in time with said marking signals by said further time-base and means for applying said timing signals also for simultaneous display by said further time-base.

16. A system comprising first and second cathode ray oscillographs, means to generate periodic sweep pulses for the first oscillograph of a predetermined duration, means to generate periodic sweep pulses for the second oscillograph of a time duration corresponding to an integral fraction of the sweep pulses of the first oscillograph, means to control the timing of the sweep pulses of the second oscillograph in equal steps of a time duration corresponding to said integral fraction, and means controlling said first oscillograph to provide a visible indication on the trace thereof during the time interval of the sweep appearing on the second oscillograph.

17. A pulse indicator system comprising a cathode ray oscillograph, a sweep generator applying to said oscillograph a periodic sweep pulse of a predetermined duration, pulse producing means controlled in timed relation with said sweep generator for applying to said oscillograph a periodic reference pulse of variable timing with respect to said sweep pulse to provide a visible reference indication on the trace of said oscillograph, said reference pulse having a duration which is short with respect to said predetermined duration, a pulse receiver controlling said oscillograph to produce thereon indications of pulses received during the sweep thereof, a pulse indicator, and a circuit including a normally-blocked electron tube amplifier connecting said receiver to said indicator and rendered operative by said reference pulse to limit the pulses supplied from said receiver to said indicator to only those received during the time of said visible reference indication.

18. A pulse indicator system comprising first and second cathode ray oscillographs, pulse producing means applying to said first oscillograph periodic sweep pulses of a predetermined duration, a second pulse producing means applying to the second oscillograph periodic sweep pulses having a duration which is short with respect to said predetermined duration, means for varying the timing of the sweep pulses of the second oscillograph with respect to the sweep pulses of the first oscillograph, means applying a periodic indicator pulse to said first oscillograph to provide a visible reference indication on the trace thereof during the time interval of the sweep of the second oscillograph, a pulse receiver controlling said first oscillograph to produce thereon indications of pulses received during the sweep thereof, and a circuit including a normally-blocked electron tube amplifier connecting said receiver to said second oscillograph and rendered operative by said indicator pulse to limit the pulses supplied from said receiver to said second oscillograph to only those received during the time of said visible reference indication.

19. A pulse indicator system according to claim 18 wherein said second pulse producing means produces a plurality of sweep pulses for each sweep pulse produced by said first pulse producing means, and including means controlled by said indicator pulse for rendering only one of the sweep pulses in said plurality effective in sweeping the beam of the second oscillograph across its screen.

References Cited in the file of this patent

UNITED STATES PATENTS

| | | |
|---|---|---|
| 1,960,333 | Du Mont | May 29, 1934 |
| 2,121,359 | Luck et al. | June 21, 1938 |
| 2,130,134 | Iams | Sept. 13, 1938 |
| 2,178,074 | Jakel et al. | Oct. 31, 1939 |
| 2,215,197 | Sherman | Sept. 17, 1940 |
| 2,227,598 | Lyman et al. | Jan. 7, 1941 |
| 2,243,234 | Von Duhn | May 27, 1941 |
| 2,244,513 | Burton | June 3, 1941 |
| 2,294,015 | Salb et al. | Aug. 25, 1942 |
| 2,300,189 | Wolff | Oct. 27, 1942 |
| 2,312,761 | Hershberger | Mar. 2, 1943 |
| 2,355,363 | Christaldi | Aug. 8, 1944 |
| 2,512,923 | Dippy | June 27, 1950 |